SYSTEM FOR RECORDING SOUND MAGNETICALLY

Filed Dec. 10, 1953

INVENTORS
THURLOW M. GORDON, JR.
HOWARD L. TAYLOR, JR.
BY
Byerly, Townsend & Watson
ATTORNEYS United States Patent Office 2,906,827

Patented Sept. 29, 1959

2,906,827

SYSTEM FOR RECORDING SOUND MAGNETICALLY

Thurlow M. Gordon, Jr., Brookfield, and Howard L. Taylor, Jr., Brookfield Center, Conn.

Application December 10, 1953, Serial No. 397,336

5 Claims. (Cl. 179—100.2)

Figure 1:
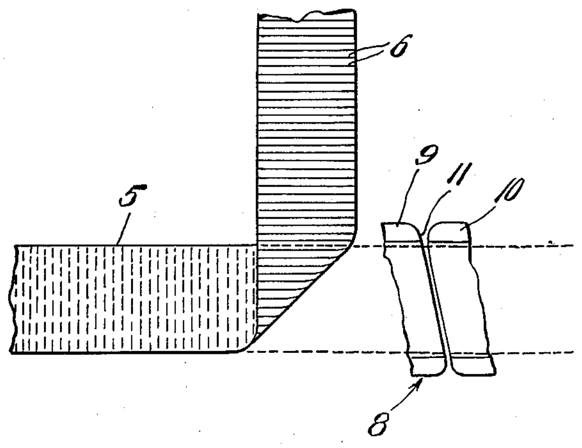

This invention relates to magnetic recording and aims to provide an improvement in the method of recording information magnetically upon a tape. It is a particular object of our invention to provide an improved method of recording sound magnetically on a travelling tape.

In the past, sound has been recorded on a tape which had been impregnated, or uniformly surface coated with a magnetic substance such as finely divided iron powder or a magnetic oxide of iron, by causing the tape to pass over a magnetic recording head. Variations in the magnetic flux of the gap between the pole pieces of such a recording head, controlled by variations in the sound to be recorded, cause the tape passing across the recording head to become magnetized to varying degrees. Thereafter, when the magnetized tape is caused to traverse again the same or a similar pair of pole pieces, it will induce flux in the pole pieces and thus will cause a voltage to be induced in accordance with the recorded signal.

In past magnetic tape recording, the frequency response has been dependent upon the rate at which the tape has been drawn across the recording head. When the width of the recording gap is one one-thousandth of an inch, the frequency response in kilocycles is equivalent to the tape speed in inches per second. For example, with a recording gap of one one-thousandth of an inch and a tape speed of eighteen inches per second, the greatest theoretical frequency response which can be achieved is of the order of 18,000 kilocycles. In practice, the response would be somewhat less due to various forms of degeneration of the record. This has imposed a serious limitation upon magnetic tape recording. The quantity of tape which was necessarily consumed to achieve high frequency response was excessive, requiring large, cumbersome and expensive reels of tape.

We have discovered that it is possible to overcome the foregoing limitation, and to achieve a frequency response which could not be obtained in the past because of the limitations imposed by practical linear speeds of tape moving past a recording head for a specified dimension of gap, by causing the members of a series of narrow, discrete, parallel bands of magnetic material to traverse the gap of a magnetic recording head in such a way that the gap intersects the bands at an acute angle and progressively magnetizes the successive members of the series. This can be accomplished, according to our invention, by causing a tape formed from non-magnetic material and provided with a series of narrow, discrete, parallel bands of magnetic material to travel at constant velocity past a magnetic recording head. The gap of the recording head is so disposed that it extends across the path of travel of the tape and intersects the bands thereon at an acute angle so that the gap will always be in recording relationship with at least one of those bands as the tape travels past the recording head.

Figure 2:
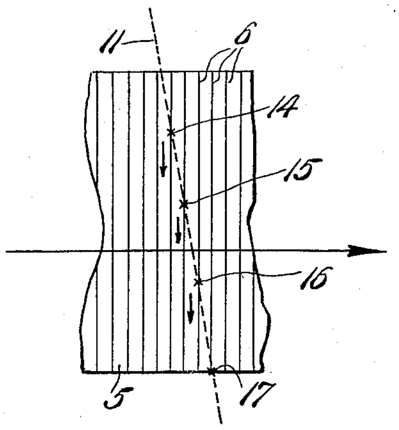

In order that our invention will be clearly understood by those skilled in the art, we will describe the practice of our new method of magnetic recording by means of the apparatus illustrated diagrammatically in the accompanying drawing in which:

Fig. 1 illustrates a portion of a tape bearing magnetic bands and the path thereof cross the gap between the poles of a magnetic recording head pursuant to our invention; and Fig. 2 is a fragmentary plan view, greatly enlarged, of the tape shown in Fig. 1 and illustrating the intersection of the bands of magnetic material with the gap of the recording head.

The tape which we use in the practice of our invention consists of a long strip of thin, flexible, anti-magnetic material such as paper or a plastic. This strip is provided, by impregnation or surface coating, with a series of discrete, parallel, narrow bands of a magnetic material such as finely divided iron powder or a magnetic oxide of iron. A portion of such a tape is illustrated in the drawing. It consists of a strip of thin, flexible material 5, one surface of which bears, as a coating, a series of spaced transverse bands 6 of finely divided magnetic oxide of iron. Sound is recorded magnetically on such a tape by causing it to travel by conventional mechanism (not shown) past a recording head indicated generally at 8, and having a pair of poles 9, 10 separated by a narrow gap 11. The path of the tape past the recording head 8 is indicated by dotted lines in Fig. 1, the tape illustrated in that figure being shown as bent back across itself to illustrate the bands 6 and to show recording head 8.

As the tape travels over a recording head 8, the bands 6 are intersected by the gap 11 at an acute angle. The gap extends beyond the edges of the tape 5 and the modulated magnetic flux is distributed over the whole length of the gap. However, its effect upon the tape is limited at any given moment to the point or points at which the bands 6 intersect the gap. The spacing of bands 6 and the angle at which they are intersected by gap 11 are such that at least one and preferably several bands 6 are always intersected by gap 11 as tape 5 travels past recording head 8. The result is that, as tape 5 is moved at a uniform rate of speed past recording head 8, the point of intersection of the gap 11 with a band 6 moves along the latter and areas of variable magnetization are formed which are disposed across the tape along the bands 6 of magnetic material.

The intersection of the gap of a recording head with the bands of magnetic material borne past that head by a tape is illustrated in Fig. 2. The orientation of the recording gap 11 is illustrated by a dotted line which is shown, by way of example, to intersect four bands 6 at points 14, 15, 16 and 17. As indicated by the large arrow, the direction of travel of the tape 5 is to the right past the stationary gap 11. This produces a downward shift, in the direction of the small arrows, of the points of intersection at which the recording takes place. It will be noted that, regardless of the orientation of gap 11, each band 6 can be traversed only once by a point of intersection therewith, and, when the gap 11 intersects more than one band 6 at a time, the result is that the recording is duplicated as many times as there are lines intersected.

When the rate of tape travel past a recording head 8 is constant, the velocity at which the point of intersection of gap 11 with a band 6 will move along that band is a function of the cotangent of the angle of the gap with respect to the band. For instance, when gap 11 intersects bands 6 at an angle of 45°, the velocity at which the points of intersection will move across the bands is equal to the rate of tape travel. As this angle is decreased, the velocity increases as a function of the cotangent, theoretically approaching infinity as the angle approaches 0°. Therefore, a practical tape speed is capable of recording at an effective rate of magnetizing velocity many times greater than the linear speed of the tape past the recording head. Hence, the rate at which a magnetic record can be made upon the bands 6 may be controlled by adjusting the angle of intersection of gap 11 with those bands without varying the speed of tape 5.

In play-back, the recording head 8, or a similar head, is used as a monitor and the areas of variable magnetization are presented to the gap thereof in the same sequence and following the same behavior as that described for recording.

The terms which we have used in describing our invention are terms of description and not of limitation, and it will be understood that variations can be made in the tape and recording head which we have described without departing from the spirit of our invention as it is defined in the appended claims. For instance, the recording gap 11 may be disposed perpendicular to the path of the tape 5, in which event, bands 6 may be disposed at an acute angle thereto.

What is claimed is:

1. A magnetic recording system, which comprises a tape having a series of narrow, discrete, parallel bands of magnetic material disposed on its face, a magnetic recording head, means for causing the tape to travel at constant velocity past said recording head, and a gap located in said recording head and extending across said tape along a plane intersecting said bands at an acute angle.

2. A magnetic sound recording system, which comprises a tape formed from non-magnetic material and having a series of narrow, discrete, parallel bands of magnetic material disposed on its face, a magnetic recording head, means for causing the tape to travel at constant velocity past said recording head, and a gap located in said recording head and extending across the path of travel of said tape along a plane intersecting said bands at an acute angle so that the gap will always be in recording relationship to at least one of said bands as the tape travels past the recording head.

3. A magnetic sound recording system, which comprises a tape formed from non-magnetic material having a series of substantially transverse, narrow, discrete bands of magnetic material disposed on its face, a magnetic recording head, means for causing the tape to travel at constant velocity past said recording head, and a gap located in said recording head and extending across said tape along a plane intersecting said bands at an acute angle so that the gap will always be in recording relationship to at least one of said bands as the tape travels past the recording head.

4. A magnetic sound recording system, which comprises a tape of non-magnetic material having a series of substantially transverse, narrow, discrete bands of magnetic material disposed on its face, a magnetic recording head, means for causing the tape to travel at constant velocity past said recording head, and a gap located in said recording head and extending across the face of said tape along a plane disposed at an acute angle to the path of travel of said tape so that the gap will always be in recording relationship to a plurality of said bands as the tape travels past the recording head.

5. A magnetic sound recording system, comprising a tape of non-magnetic material having generally transverse, parallel, narrow, discrete bands of magnetic material disposed on its face, a magnetic recording head adapted to magnetize the material in said bands, means for causing said tape to travel at constant velocity past said recording head, a gap located in said recording head and extending across the path of travel of the tape along a plane intersecting said bands at an acute angle, and means for regulating the angle at which said plane intersects said bands whereby the speed at which said bands are magnetized is controlled.

References Cited in the file of this patent

UNITED STATES PATENTS

| | | |
|---|---|---|
| 1,656,216 | Melby | Jan. 17, 1928 |
| 2,543,483 | Barrett | Feb. 27, 1951 |
| 2,782,043 | Andrews | Feb. 19, 1957 |